US005936178A

United States Patent [19]

Saari

[11] Patent Number: 5,936,178

[45] Date of Patent: Aug. 10, 1999

[54] HUMIDITY CONTROL DEVICE

[75] Inventor: Albert L. Saari, Plymouth, Minn.

[73] Assignee: Humidi-Pak, Inc., Minneapolis, Minn.

[21] Appl. No.: 08/871,560

[22] Filed: Jun. 10, 1997

[51] Int. Cl.[6] .......... G05D 22/00

[52] U.S. Cl. .......... 84/453

[58] Field of Search .......... 84/453; 261/119.1; 340/620; 95/90; 206/314, 14

[56] References Cited

U.S. PATENT DOCUMENTS

| | | | |
|---|---|---|---|
| 4,150,372 | 4/1979 | Foote | 340/235 |
| 4,406,843 | 9/1983 | Nakamura et al. | 261/22 |
| 4,572,051 | 2/1986 | Laskin | 84/453 |
| 4,649,793 | 3/1987 | Blackshear et al. | 84/453 |
| 5,289,751 | 3/1994 | Light | 84/275 |

OTHER PUBLICATIONS

Credo of Marseille, France; "The Tube"; Humidity Regulator for Pocket Humidor.

Western Humidor Corporation of USA; "Torpedo"; Humifier Portable Humidification System.

PTAC Industries, Inc., P.O. Box 16360 (Office), San Francisco, CA 94116; P.O. Box 250 (Factory), San Carlos, CA 94070; Phone (415) 592–1100; Fax (415) 592 7311; "Humatic 50"; Conditions and maintains up to 50 cigars. US and foreign patent pending.

Caribbean Cigar Company or Miami, Florida; "Simple 70 Solution & Humidification"; The Humidification Solution.

Owner unknown; "DHS"; Disposable Humidification System.

Altura Company, Division of Peak Innovations, Inc. Quality Preserved, 6159 Omni Park Drive, Suite B, Mobile, AL 36609; Phone (334) 639–0345; Fax (334) 639–8983; e–mail: peak@mobls.com; "Humi–Pouch"; "Humi–Ship"; "Humi–Box"; patent pending.

*Primary Examiner*—William M. Shoop, Jr.
*Assistant Examiner*—Kim Lockett
*Attorney, Agent, or Firm*—Friederichs Law Firm

[57] ABSTRACT

A humidity control device for use in maintaining a desired humidity, the device including a protective case, a water vapor permeable pouch and a thickened saturated solution, the solution having a suitable humidity control point.

35 Claims, 1 Drawing Sheet

HUMIDITY CONTROL DEVICE

FIELD OF THE INVENTION

The present invention relates to humidity control devices and more particularly to humidity control devices for use in cases for storing stringed instruments and the like as well as use with storage of cigars; gummy bears/licorice; dried fruit; electronic devices; fine jewelry; fire arms; transportation of fine art objects such as paintings, sculptures, tapestries as well as the objects themselves and whatever is best stored under constant humidity conditions.

BACKGROUND OF THE INVENTION

Humidity control devices have been known for many years. Perhaps one of the earliest humidity control devices was simply a pan of water setting on a stove or heater. The pan was repeatedly re-filled with water as the heat from the stove or heater evaporated the water. The water vapor raised the humidity in an environment of low moisture.

It is well recognized that during cold weather, particularly in the Northern climes, the indoor moisture content may often be very low. This low humidity causes damage. For example, the drying out of wood pieces that have been glued together often results in the wooden pieces coming apart at glued joints. In other words, wooden furniture with pieces glued together become loose and eventually may entirely separate. Legs may fall off chairs or legs may become disassociated from a table.

Over the years, sophistication has developed in humidity control devices. Homes today often include a humidifier that is associated with the central furnace or heating system. Water is automatically fed into the humidifier. The water is exposed to warm moving air which picks up the moisture, carrying the water vapor throughout the home. Electronic controlled humidity regulators are very effective, but expensive and not very portable. Desiccants have been used to completely or almost completely remove all the humidity in the air. Desiccants typically leave the humidity at or quite near zero percent.

In other instances environments may contain an excess amount of water vapor. Such a condition is typically confronted in the below ground level portion of the house, typically referred to as a basement. If the basement is located in a soil environment that contains high moisture, the moisture may move through the walls e.g. concrete, of the basement raising the moisture content in the basement air to an unacceptably high level.

Devices have been designed to lower the moisture content, such devices are commonly referred to as dehumidifiers. These devices often work on a principle of refrigeration. The devices include a coil (tubular coil) through which a compressible fluid is passed. When the fluid is permitted to expand, the fluid rapidly lowers the temperature of the tubing. As moist air is passed over the tubing, condensation takes place on the tubing forming water which drops down into a removable pan. Periodically the pan is removed and emptied. All too often, the dehumidifier is forgotten, the pan overflows onto the floor and the water then evaporates, again raising the humidity.

Humidifying devices and dehumidifying devices of the type just described are generally not suitable for use in an instrument case containing a violin. The described humidifying devices and dehumidifying devices take up a substantial amount of space and simply will not fit within a violin case. Attempts have been made to design small devices that fit within a violin case.

Humidifiers today are available from musical instruments supply houses such as International Violin Company, Ltd. of Baltimore, Md. Such devices typically include a small bottle with a fine rubber tube extending out of the bottle. When the bottle is filled with water, water will run through the fine tube to the open end of the tube. Surface tension permits the flow of the water to the open end of the tube, but does not permit the water to flow through the open end of the tube. Another type includes a flexible polymeric tube with a plurality of openings. This tube contains media that holds water, e.g. sponge-like. The water evaporates out through the openings. Humidifiers of this type are placed within the violin case and tend to elevate the moisture in the air contained within the case.

While such devices are commonly found today, these devices have inherent problems. For example, the bottle may come open and release the water in the violin case. The water may wet the wood of the violin adversely affecting the finish as well as causing a release of adjacent glued surfaces.

One is confronted with two alternatives. One may leave the case without a humidifying device and risk the instrument drying out to such an extent that the glued surfaces separate. Alternatively, one may place a prior art humidifier device, of the type described, in the case with the risk the device leaks and a larger than desired amount of water may escape from the humidifier, wet the adjacent wood surface and/or glued surfaces, resulting in damage. The wood surface may warp or have varnish separation.

The glued surfaces may separate and the belly or the back may separate from the remainder of the instrument. The financial risk in many instances is substantial. The value of such instruments may run into the hundreds of thousands of dollars. Damage to the instrument may reduce its value very substantially. The present invention over comes the inherent problems of prior humidity control devices.

SUMMARY OF THE INVENTION

The present invention provides a device for controlling the relative humidity in an environment such as a cigar humidor, a violin case, a jewelry case, a computer hard drive case or the like. The present invention utilizes a saturated aqueous solution of a solute such as a salt or a sugar or another soluble compound that inherently creates a desired relative humidity in the air space adjacent to the humidity control device. The solution includes a substantial amount of water in a fluid form as a saturated salt solution. The solution further includes a gel forming material such as an alginate or xanthan. The combination of vegetable gum, water and salt provides a highly viscous fluid. In the present invention, the viscous solution is contained in a polymeric pouch. The polymeric pouch may be of a thin film of polyethylene (high density or low density), oriented polystyrene or the like. The solution may be a hydrocolloid including soluble gums (alginate, xanthan, pectin) a protein gel (egg albumen, gelatin) or inorganic polymer (silicate).

The pouch may be protected within a rigid casing. A casing suitable for use in the present invention is a tube for example of ⅝" to +e,fra 3.25+ee ". The pouch maybe placed within the cylinder and end caps placed on each end of the tube. The tube walls may have openings defined therein to permit the movement of water vapor through the tube walls. The pouch containing the salt gel may also be protected with an envelope, pouch, netting, or perforated plate that allows relatively free passage for water vapor, yet protects the more fragile salt pouch from mechanical damage. Alternately, the container for the salt pouch may be impermeable except for a "window" through which water vapor can freely pass.

Any of various salts may be used to prepare the salt solution. For example, the solute may be a single salt such as sodium chloride, ammonium nitrate, potassium nitrite or a mixture of salts such as 50/50 potassium chloride and ammonium nitrate or a non-ionic compound such as sucrose. As another example, approximately a 50/50 by weight combination of potassium chloride and ammonium nitrate or ammonium carbonate and calcium chloride are suitable.

Several different anions and cations can be combined to produce the proper salt solutions. The anions which may be used are: nitrate, nitrite, chloride, bromide, fluoride, and iodide. The cations which may be used are: lithium, sodium, potassium, rubidium, cesium, magnesium, calcium, strontium, and barium.

Sugars, sugar alcohols, polybasic acids, and salts of polybasic acids may also be used to produce the proper solutions. Some of the sugars which may be used are sucrose, fructose, glucose, galactose, etc. Some of the sugar alcohols which may be used are sorbitol, xylitol, and mannitol. Some of the polybasic acids which can be used are citric, maleic, malic, and succinic. The salts of the polybasic acids which are usable are sodium citrate, sodium malate, and sodium tartrate.

Several different compounds are usable for creating the solutions. The following list is only a partial list of the compounds which are usable: lead chlorate, lead perchlorate, manganese chloride, mercuric nitrate, potassium dichromate, potassium permanganate, sodium chromate, aluminum nitrate, ammonium chloride, ammonium dihydrogen phosphate, ammonium bi-sulfite, barium bromide, cobalt sulfate, copper sulfate, copper nitrite, ferrous sulfate, and ferric bromide.

A solution of sodium chloride will provide a relative humidity at about 74%. If the humidity starts to fall below 74%, the salt solution gives up water to form moisture in the air until the air reaches a relative humidity of 74%. The water travels through the wall of the polymeric pouch and out through the various openings in the protective pouch case. On the other hand, if the moisture in the air around the present device rises above 74% relative humidity, the salt solution will pick up moisture from the air lowering the relative humidity to approximately 74%. A solution of sodium chloride with excess solid crystals of sodium chloride will provide a relative humidity of about 74%.

Some examples of humidities possible with single and mixtures of solutes are listed below. Some solutes that produce/maintain humidity levels in the 90% or higher range are: potassium sulfate at 97%; potassium nitrate at 92%; cesium iodide at 91%; and barium chloride at 90%.

Some solutes that produce/maintain humidity levels in between 80% and 89% are: potassium chloride at 84%; sucrose at 84%; ammonium sulfate at 81%; and potassium bromide at 81%.

Some solutes that produce/maintain humidity levels in between 70% and 79% are: sodium nitrate at 74%; sodium chloride at 74%; and strontium chloride at 71%.

Some solutes that produce/maintain humidity levels in between 60% and 69% are: potassium iodide at 69% and sodium nitrite at 66%.

Some solutes that produce/maintain humidity levels in between 50% and 59% are: sodium bromide at 58%; sodium dichromate at 55%; and magnesium nitrate at 53%.

A solute that produces/maintains humidity levels in between 40% and 49% is potassium carbonate at 44%.

Some solutes that produce/maintain humidity levels in between 30% and 39% are: sodium iodide at 38% and magnesium chloride at 33%.

A solute that produces/maintains humidity levels in between 20% and 29% is calcium chloride at 29%.

Some solutes that produce/maintain humidity levels between 18% and 6% are: lithium iodide at 18%; lithium chloride at 11%; potassium hydroxide at 9%; zinc bromide at 8% and lithium bromide at 6%.

Other salts or combinations of salts can be used to obtain virtually any relative humidity. For example, a solution of sodium chloride, potassium nitrite and sodium nitrite of equal molar portions has a relative humidity of 31%. As another example, a solution of ammonium chloride and potassium nitrate has a relative humidity of 72%.

It has been found desirable in the instance of a cigar humidor holding 4, 6 or 8 cigars to provide a pouch that is capable of passing at least 0.75 grams of water vapor per 24 hour period. This will permit maintenance of the proper humidity in the humidor with the humidor being opened up to five times in an environment of less than 30% relative humidity. In most use situations of the present invention a preferred water vapor transmission rate may be in the range of 1 to 3 grams per day per pouch. This allows for a reasonably quick restoration of equilibrium in the chamber, e.g. about 2 hours.

The moisture vapor transmission rate (MVTR) is determined by the type of film used and the thickness of the film. The total transmission is also affected by the area exposed to the chamber as well as the solution. For example, a 0.5 mil polyvinylchoride film will transmit about 8 grams per 100 square inches in 24 hours; whereas, a 1.0 mil film of the same material will transmit about 3 or 4 grams in the same time period. The latter is on the lower end of the practical range for many uses. Ideally, the rate should be approximately 10 grams moisture per 100 square inches per 24 hours. The usable (practical) range for most applications is 5 to 15 grams per 100 square inches per 24 hours. The possibility exists to use rates as low as 0.1 grams per square meter per 24 hours if a necessity exists to maintain a humidity level in a chamber that has very little, if any, permeation of moisture vapor through the walls or if one is willing to build a pouch with a very large surface area. This rate may work well for disc drives in computers.

Ideally, one would like to have a very large rate, i.e., 25+ grams per day. However, it has been found that undesirable seeping may occur if the transmission rate exceeds 15 grams per 100 square inches per day. Using a good firm gel inside of the pouch mitigates this seepage problem significantly, but not completely. Films may become available in the future with very high MVTRs and be suitable for these applications.

An important function is to get as much transmission of vapor as possible and practical because it is preferable to reestablish equilibrium in a chamber as quickly as possible. The higher the transmission rate, the better the performance in retaining the proper moisture level in the material being protected in the chamber. The preferred range of water vapor transmission rates should be on the order of 1 to 3 grams per day for restoration and maintenance of humidity in a 2 inch by 4 inch by 10 inch chamber where cigars are stored.

While one could make a regulator with a surface of 100 or more square inches, these would be rather cumbersome and awkward to employ. If the film passes 5 to 10 grams of water vapor per 100 square inches in 24 hours, one need only make a pouch of approximately 10 to 20 square inches to fulfill the performance requirements.

Typical films that meet the requirements of the present invention include food wrap films of polyvinylchloride, microfiberous polyethylene (TYVEK™ from Dupont), microporous polyethylene, high density polyethylene, oriented polystyrene, cellophane, polycarbonate, and the like that have MVTR of 3 grams or more.

Several other films may be used. The following is a list of possible materials which the films can be made from: polyester, polyamides, polyurethane, ethylcellulose, cellulose acetate, polybutylene, polyethylene terphatlate, polyvinylidene, polyvinylfluoride, and polyvinylalcohol. A variety of copolymers and laminates may also be used. Films can be made from rubbers with suitable properties as well.

Other types of films may be used. Very thin versions of low density polyethylene, polystyrene, or polypropylene and the like are also functional but may lack strength and but can be protected by a screen or a lower grade of a material like TYVEK™ film (microfiberous polyethylene). However, these thin films are more difficult to fabricate with leak-free seams.

IN THE DRAWINGS

Figure 1:
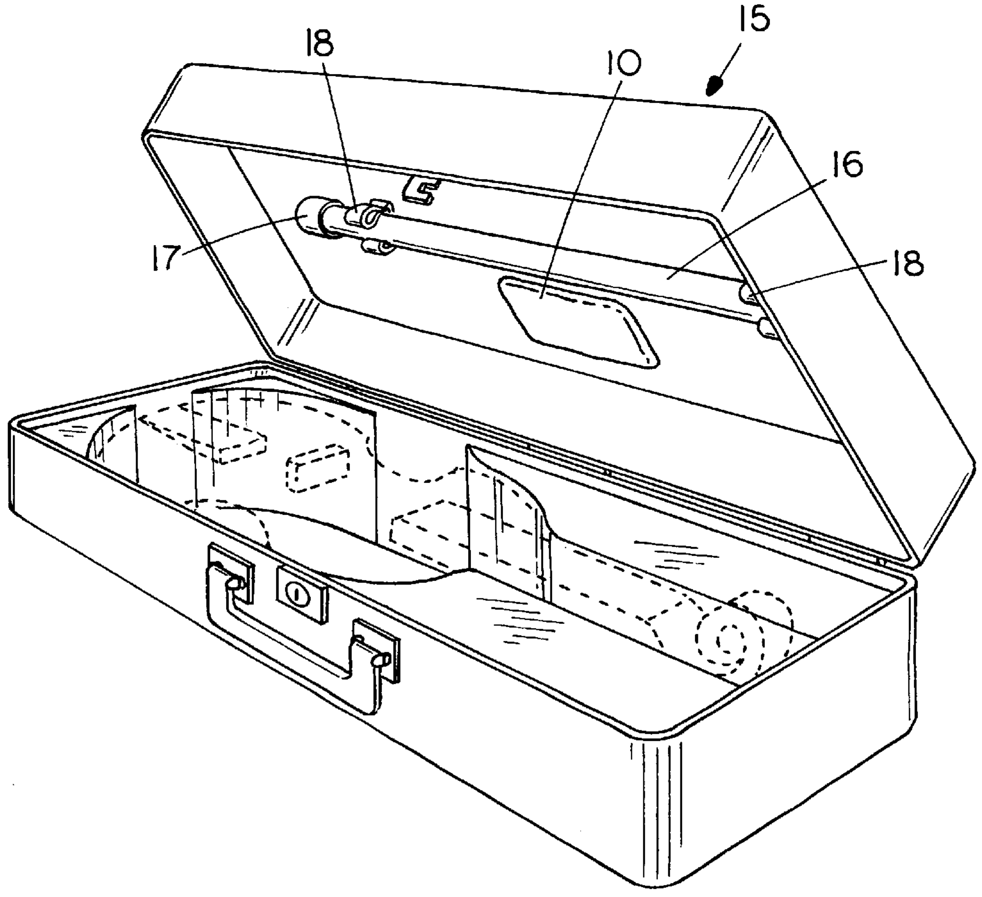
FIG. 1 is a perspective view of the pouch of the present invention shown in conjunction with a violin case.
Figure 2:
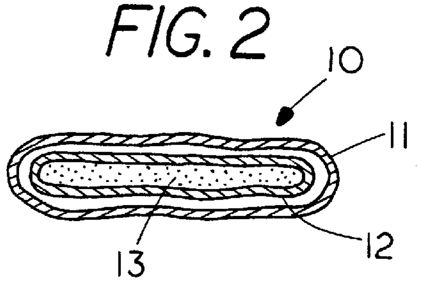
FIG. 2 is a cross sectional view of the pouch of the present invention.
Figure 3:
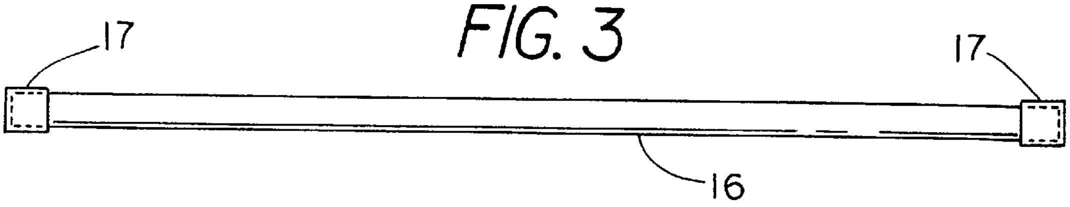
FIG. 3 is a plan view of the tubular structure of the present invention.

The pouch 10, FIGS. 1 and 2, of the present invention includes a protective case 11 having walls with a plurality of openings and a water vapor permeable pouch 12 contained within the protective case 11. A salt solution 13 is contained within the permeable pouch 12. The pouch 10 may be secured in the string instrument case 15 by conventional mechanism. The tubular structure 16 having openings is closed with a pair of end caps 17 through which water vapor may pass. The tubular structure 16 may contain the salt solution of the present invention. The tubular structure 16 may be secured in the string instrument case 15 such as by the securement mechanism 18.

Detailed Description Of The Present Invention

The present invention comprises a humidity control device including a case with a plurality of openings, a polymeric pouch having walls sufficiently thin to permit migration of water through the film in the form of water vapor and yet thick enough to prevent the escape of liquid water, and a solution including an organic or an inorganic solute (e.g., salt or sugar), vegetable gum and water. The saturated solution contains excess solute (e.g., salt or sugar crystals) and is preferably made more viscous with a thickening agent. In some select situations, a fungicide or inhibitor as well as a small amount of a buffering salt mixture may be necessary.

The case may be of any suitable size and shape. For use with a violin case, the device will be rather small for example 2 to 5 inches in length and perhaps ½ inch to 1 inch in diameter. Alternatively, when larger reservoir of moisture control is necessary, the pouch may be pillow-like of sufficient mechanical properties of substantially larger dimensions. For example, a pouch of 2.5 inches by 5.5 inches could contain about 1.5 ounces of moisture or a pouch of 3.5 inches by 7 inches could contain about 3 ounces of water. Much larger pouches can be designed to accommodate needs for large reservoirs such as for a piano or a bulk package of tobacco products or confections. Multiple pouches are normally needed in larger chambers (100 cubic inches) unless provisions are made to circulate the air in the chamber. For certain applications, the container may be of an impermeable material with a window of a film with suitable water vapor transmission properties. On the other hand, the case may be much larger for use in conjunction with a bass violin, perhaps 8 to 10 inches in length and 1 ½ to 2 inches in diameter. The case may be of any suitable material, for example, a polymer, metal, glass, ceramic, wood, etc. The preferred material is flexible polyethylene, or a similar material, or a rigid polystyrene, or a similar material, for most applications. The case may also be made from netting or felt-like material such as paper, cloths, fur felt, plastic fibers, etc. However, other materials may be suitable as well. For example, wood may be used in expensive units where esthetics are important. The case may have an operable end portion for receipt of the pouch and salt solution. The internal container zone may be for example circular, rectangular, or triangular in cross section. The device may even be spherical in shape. Generally, it is advantageous to have maximum surface area per unit volume. The wall of the case has defined therein a plurality of small openings. In one preferred embodiment the openings were oval in shape being approximately 1/16 inch by 1/8 inch in open area. The openings may be provided adjacent to one another with sufficient adjacent wall structure to provide the strength and protection desired to prevent damage to the pouch. One preferred device according to the present invention contained 20% open area. The strength requirement is dependent on the application and the abuse to which the case may be subject.

The pouch of the present invention may be constructed of any polymeric material such as polyethylene, polystyrene, polyvinylchloride, polybutylene, polycarbonate, cellophane, microporous polyethylene, microfiberous polyethylene and the like that will provide the porosity necessary for the movement of the water vapor and retention of liquid water. The most suitable materials are polyvinylchloride—shrink wrap, polyvinylchloride, microporous polyethylene and microfibrous polyethylene. Other suitable materials are K-Resin (from Phillips Petroleum), low density polyethylene if less than 0.3 mil thick, cellophane (brittleness may be a problem), and polystyrene films of 0.5 mil or less, thin polycarbonate, etc. Typically the film from which the pouch is constructed will have a thickness of 0.25 to 1.0 mils. The film may be as thin as 0.15 mils or thinner. Depending upon the polymer from which the pouch is made, the film may have a thickness of 1 mil or greater, providing sufficient moisture migration can take place through the film. As a general matter, thinner film is preferred providing the strength of the film is sufficient to avoid rupture during normal use.

Films are characterized by moisture transfer rates. The preferred rate of moisture transfer in the films of the present invention may be as low as 0.1 grams per square meter per 24 hours. The preferred rate is in the range of about 10 to 25 grams per 24 hours per square meter of film. Because of the cost and manufacturing considerations, the useable range for most applications is 5 to 15 grams per 24 hours. Rates as low as 0.1 gram per square meter per 24 hours may be adequate if the chamber has very little, if any, permeation of moisture vapor through the walls or if a pouch with a very large surface area is built.

The solution of the present invention may be any suitable solute which has a saturated solution at 20% solute in water (percent by weight of solute in weight of solution) as a minimum and any solute that will provide a saturated solution at 75% solute in water (percent by weight of solute in weight of solution) as a maximum. The preferred range of solubility is 25 to 50%. The preferred saturated solution contains 50% solute and 50% water, however, the maximum range contemplated in the present invention provides a saturated solution at 5% solute and as high as 90% solute by weight. A suitable solution may include a 50/50 combination of ammonia nitrate and calcium chloride, this solution will provide a relative humidity slightly under 70%. Some sugars may be suitable. Sucrose is suitable, but works at a slower rate than salts. Glucose and fructose work well for disposable pouches. These two sugar solutions work for five to ten cycles. Sodium chloride is a preferred salt which is used in a large range of applications because of its humidity (ca 75%), good solubility (25%), non-toxicity, and cost. Other salts or solutes would be used if a different humidity is desirable.

The salt solution of the present invention is thickened with a vegetable gum. The vegetable gum must be suitable for use in the concentrated salt solution. The preferred thickeners are propylene glycol alginate and xanthan. Other usable vegetable gums are pectin, guar, arabic, tragacath, or starches. Some microbial gums which are usable are: Gellan and Xanthan. Some seaweed gums which are usable: such as carrageenan, alginate such as sodium alginate or calcium alginate. Some synthetic gums which are usable are: carboxymethyl cellulose and propyleneglycol cellulose. Since many of these gums are unstable thickeners for saturated salt solutions, the resulting syneresis of saturated salt solutions requires 100% integrity of pouch seals. The preferred concentration is at 1 to 2% of the total solution which gives viscosity ranges in excess of 2500 cps which is acceptable to an actual gel. Such a viscosity is adequate to maintain a uniform suspension of the excess solute during filling of the pouches with the solution. A thixotropic or shear thinning gel is preferred for manufacturing purposes. Viscosities between 1500 cps and 5000 cps will work. The preferred viscosity is 2500 cps. Viscosities of less than 2500 cps can be used with proper seals at the seams. In some instances, the present invention may be without the addition of a gum or any other type of thickening agent.

If desired the present humidity control device may include a mechanism for securing the device in place such as in the violin case. One suggested approach is the use of VELCRO® mounting, a hook and loop mechanism, in the case.

Examples of the Present Invention

EXAMPLE 1

The following is an example of the present invention. Approximately 40 grams of propylene glycol alginate (Kelcoloid HVF, Kelco Corp.) was thoroughly blended with 200 grams of sodium chloride. This mixture was added to 250 ml tap water at room temperature with vigorous stirring until the suspension was homogeneous to the naked eye. This gel was placed into tubes of 0.35 or 0.7 mil polyethylene tubing, sealed and inserted into a tube, ½ inch internal diameter and ⅝ inch external diameter. This unit is suitable for inclusions into a cigar humidor of approximately 6 inches by 4 inches by ¾ inches.

A pouch containing 7 grams of the above gel was placed in water at room temperature (20° C.). The pouch gained approximately 0.3 grams of water per hour until all of the salt was dissolved upon which no further absorption occurred. The Moisture Vapor Transmission Rate (MVTR) was 0.07 grams per day per unit, relative humidity was 74%.

EXAMPLE 2

The following is a second example of the present invention. One-hundred fifty (150) grams of potassium chloride and 160 grams of ammonium nitrate were blended with 15 grams of propylene glycol alginate (Kelcoloid HVF). This was stirred into 300 ml of water. The resulting gel was placed into pouches of 0.7 mil polyethylene, sealed and placed into 3.25 inch tubes prepared from low density polyethylene netting material. These flexible tubes were inserted into slots prepared in pocket sized cigar humidors. The relative humidity at 20° C. was approximately 72%, the MVTR per cylinder was 0.08 grams per day.

EXAMPLE 3

Four hundred (400) grams of sugar (sucrose) and 12 grams of pregelatinized tapioca starch were added to 160 grams of water in a blender. Upon blending, a pourable thickened suspension was obtained. Forty (40) to fifty (50) gram portions were placed in pouches prepared from microfibril polyethylene (TYVEK™) coated with a heat sealing adhesive. A small amount of seepage was noted in a pouch with a poor seal at one seam of 5 pouches prepared. The MVTR per pouch was 5.5 grams per day and the relative humidity was 82%.

EXAMPLE 4

Nine (9) grams of xanthan gum and 50 grams of ammonium chloride were dry blended and added to 250 grams of water. This was mixed at a slow speed in a blender until a thick gel formed. To this was added an additional 200 grams of ammonium chloride with good mixing in the blender. Samples of about 40 grams of this gel were placed in a 3×5.5 inch pouch of 1.0 mil PVC film. The MVTR per pouch was about 0.85 grams per day and the relative humidity was 77%.

EXAMPLE 5

About 1200 grams of saturated potassium chloride solution (in water) was treated with a blend of 250 grams of powdered potassium chloride and 60 grams of propylene glycol alginate (Kelcoloid HVF) in a blender. The gelled material was placed into pouches prepared from microfibril polyethylene (TYVEK™) with a heat sealing adhesive. These pouches measuring 2.25×3.5 inches contained about 50 grams of gel. The MVTR was about 3.3 grams per pouch per day.

Operation of the Present Invention

The present invention is assembled by placing the pouch containing the thickened saturated salt solution within the container zone of the case. The case is then enclosed, for example, by securing the end portions to a tubular case. The case is then placed in the violin case in a secure location. It may for example simply lie loose within the violin case, such as in a pocket. The device may be secured in a desired location using VELCRO® mounting (a hook and loop mechanism), plastic clips or the like. For a case, such as a violin case, a plurality of pouches may be used to increase the humidity within a reasonable time.

If humidity is above the certain humidity characteristic of the salt solution, the water vapor will be removed from the air and held within the salt solution until the humidity has returned to the predetermined point. On the other hand, if the air surrounding the device falls below the characteristic humidity point, water vapor will be given off by the salt solution so the air will return to that point.

What is claimed is:

1. A humidity control device for use in a stringed instrument case for maintaining a desired humidity, said device including a protective case, a water vapor permeable pouch and a thickened saturated salt solution, said case comprising wall means defining an enclosure, said wall means including a plurality of openings through which water vapor may freely move, said pouch being formed of a thin wall polymer film through which water vapor may pass, said thickened saturated salt solution comprising water, salt and a thickening agent, said salt being present in an amount between 20 and 75 percent by weight based on the weight of the combination of water and salt, said thickening agent being present in an amount sufficient to thicken the salt solution, said thickened saturated salt solution being contained within the polymeric pouch and sealed from escape from the pouch, said pouch containing the thickened saturated salt solution being contained within the protective case to protect the pouch from rupture.

2. The humidity control device of claim 1 wherein the polymer film has a thickness of between 0.15 mils and 1 mil.

3. The humidity control device of claim 2 wherein the polymer film is a member selected from the group consisting of high density polyethylene, polyvinylcholride, oriented polystyrene, microporous polyethylene, and microfiberous polyethylene.

4. The humidity control device of claim 3 wherein the salt solution comprises a 50/50 mixture of $NH_3NO_3$ and KCl by weight.

5. The humidity control device of claim 4 wherein the thickening agent comprises propylene glycol alginate.

6. The humidity control device of claim 4 wherein the thickening agent comprises xanthan.

7. The humidity control device of claim 5 wherein the case comprises a tubular structure having openings of between about 1/16th inch by 1/8th inch.

8. The humidity control device of claim 7 wherein the case includes a pair of removable end caps.

9. The humidity control device of claim 8 wherein the case is constructed of a polymer.

10. The humidity control device of claim 9 wherein the case is about 2 to 5 inches in length and 5/8th to 3/4 inches in internal diameter.

11. The humidity control device of claim 10 wherein the device includes a securement mechanism for attaching the device to the inside of an instrument case.

12. A humidity control device for maintaining a desired humidity, said device including a protective case, a water vapor permeable pouch and a thickened saturated salt solution, said case comprising wall means defining an enclosure, said wall means including a plurality of openings through which water vapor may freely move, said pouch being formed of a thin wall polymer film through which water vapor may pass, said thickened saturated salt solution comprising water, salt and a thickening agent, said thickening agent being present in an amount sufficient to thicken the salt solution, said salt solution being contained within the polymeric pouch and sealed from escape from the pouch, said pouch containing the thickened salt solution, said pouch being contained within the protective case to protect the pouch from rupture.

13. The humidity control device of claim 12 wherein the saturated salt solution has salt present at a level of 5% to 90% salt by weight.

14. The humidity control device of claim 13 wherein the salt solution has a viscosity of 2500 cps.

15. The humidity control device of claim 13 wherein the polymer film is a member selected from the group consisting of high density polyethylene, oriented polystyrene, microporous polyethylene, microfiberous polyethylene and polyvinylchloride.

16. The humidity control device of claim 15 wherein the film has a moisture transfer rate of at least 0.1 grams per square meter per 24 hours.

17. The humidity control device of claim 15 wherein the film has a moisture transfer rate in the range of about 10 to 25 grams per 24 hours per square meter of film.

18. A method of controlling the humidity in a string instrument case comprising applying a humidity control mechanism to environment in the instrument case, said mechanism including an encased saturated salt solution, said encasement being permeable to water vapor to permit water vapor to leave the salt solution if the adjacent relative humidity is below a desired level and to pick up water vapor if the relative humidity is above a desired level.

19. A humidity control device for use in maintaining a desired humidity, said device including a water vapor permeable pouch and a thickened saturated salt solution, said pouch being formed of a thin wall polymer film through which water vapor may pass, said thickened saturated salt solution comprising water, salt and a thickening agent, said salt being present in an amount of between 20 and 75 percent by weight based on the weight of the combination of water and salt, said thickening agent being present in amount sufficient to thicken the salt solution, said salt solution being contained within the polymeric pouch and sealed from escape from the pouch, said pouch containing the thickened salt solution being contained within the protective case to protect the pouch from rupture.

20. The humidity control device of claim 19 wherein the polymer film has a thickness of between 0.15 mils and 1 mil.

21. The humidity control device of claim 19 wherein the polymer film is a member selected for the group consisting of high density polyethylene, oriented polystyrene, polyvinylchloride, microporous polyethylene, and microfiberous polyethylene.

22. The humidity control device of claim 21 wherein the salt solution comprises approximately a 50/50 mixture of $NH_3NO_3$ and KCl by weight.

23. The humidity control device of claim 22 wherein the thickening agent comprises propylene glycol alginate.

24. The humidity control device of claim 19 wherein said thickening agent is a member selected from the group consisting of hydrocolloids.

25. The humidity control device of claim 19 wherein said thickening agent is a member selected from the group consisting of soluble gums, protein gels and inorganic polymers.

26. The humidity control device of claim 19 wherein said thickening agent is a member selected from the group consisting of alginate, xanthan, and pectin.

27. The humidity control device of claim 22 wherein said thickening agent is a member selected from the group consisting of egg albumen and gelatin.

28. The humidity control device of claim 22 wherein said inorganic polymer thickening agent comprise silicates.

29. The humidity control device of claim 22 wherein said salt is a member selected from the group consisting of potassium sulfate, potassium chloride, sodium nitrate, sodium dichromate, magnesium chloride, potassium nitrate, sodium chloride, sodium bromide, potassium carbonate and lithium chloride.

30. The humidity control device of claim 22 wherein said salt is a member selected from the group consisting of sucrose, sorbitol, mannitol, glucose, 1-methylglucose, xylitol, sodium or potassium acetate, citric acid, and sodium citrate.

31. A humidity control device for maintaining a desired humidity, said device including a water vapor permeable pouch and a thickened saturated solution, said pouch being formed of a thin wall polymer film through which water vapor may pass, said thickened saturated solution comprising water, a member selected from the group consisting of salt and sugar, and a thickening agent, said thickening agent being present in amount sufficient to thicken the solution, said solution being contained within the polymeric pouch and sealed from escape from the pouch, said pouch containing the thickened solution.

32. The humidity control device of claim 31 wherein said salt is a member selected from the group consisting of potassium sulfate, potassium chloride, sodium nitrate, sodium dichromate, magnesium chloride, potassium nitrate, sodium chloride, sodium bromide, potassium carbonate and lithium chloride.

33. The humidity control device of claim 32 wherein the polymer film is a member selected for the group consisting of high density polyethylene, oriented polystyrene, polyvinylchloride, microporous polyethylene and microfiberous polyethylene.

34. The humidity control device of claim 32 wherein said thickening agent is a member selected from the group consisting of soluble gums, protein gels and inorganic polymers.

35. A humidity control device for use in maintaining a desired humidity, said device including a water vapor permeable pouch and a saturated solution, said pouch being formed of a thin wall polymer film through which water vapor may pass, said saturated solution comprising water and solute, said solute being present in an amount of between 20 and 75 percent by weight based on the weight of the combination of water and solute, said solution being contained within the polymeric pouch and sealed from escape from the pouch.

* * * * *

UNITED STATES PATENT AND TRADEMARK OFFICE
Certificate

Patent No. 5,936,178 Patented: August 10, 1999

On petition requesting issuance of a certificate for correction of inventorship pursuant to 35 U.S.C. 256, it has been found that the above identified patent, through error and without deceptive intent, improperly sets forth the inventorship.

Accordingly, it is hereby certified that the correct inventorship of this patent is: Albert Saari, Plymouth, Minnesota; and Robert L. Esse, Monticello, Minnesota Signed and Sealed this Twelfth Day of February 2002.

ROBERT NAPPI
*Supervisory Patent Examiner*
Art Unit 2837